United States Patent
Jeong et al.

(10) Patent No.: US 11,085,359 B2
(45) Date of Patent: Aug. 10, 2021

(54) SWIRL CHAMBER-TYPE DIESEL ENGINE

(71) Applicant: LS MTRON LTD., Anyang-si (KR)

(72) Inventors: Jae Young Jeong, Anyang-si (KR); Chang Kyu Lee, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 0 days.

(21) Appl. No.: 16/636,851

(22) PCT Filed: Aug. 13, 2018

(86) PCT No.: PCT/KR2018/009235
§ 371 (c)(1),
(2) Date: Feb. 5, 2020

(87) PCT Pub. No.: WO2019/045314
PCT Pub. Date: Mar. 7, 2019

(65) Prior Publication Data
US 2020/0362748 A1   Nov. 19, 2020

Related U.S. Application Data

(63) Continuation of application No. PCT/KR2018/009235, filed on Aug. 13, 2018.

(30) Foreign Application Priority Data

Aug. 30, 2017  (KR) .................. 10-2017-0110082
Sep. 21, 2017  (KR) .................. 10-2017-0122005

(51) Int. Cl.
| | | |
|---|---|---|
| F02B 19/08 | (2006.01) | |
| F02B 19/18 | (2006.01) | |
| F02F 3/24 | (2006.01) | |
| F02F 3/26 | (2006.01) | |

(52) U.S. Cl.
CPC .............. *F02B 19/08* (2013.01); *F02B 19/18* (2013.01); *F02F 3/24* (2013.01); *F02F 3/26* (2013.01)

(58) Field of Classification Search
CPC .......... F02B 19/08; F02B 19/18; F02B 19/10; F02F 3/24; F02F 3/26; Y02T 10/12
See application file for complete search history.

(56) References Cited

U.S. PATENT DOCUMENTS 4,881,501 A * 11/1989 Shinzawa ........... F02B 23/0639
123/279
5,024,194 A * 6/1991 Shinzawa ................. F02F 3/26
123/269

(Continued)

FOREIGN PATENT DOCUMENTS

JP    H04330324 A    11/1992
JP    H0828271 A     1/1996

(Continued)

OTHER PUBLICATIONS

Korean Office Action for related Korean Application No. 10-2017-0122005; action dated Oct. 5, 2020; (4 pages).

(Continued)

*Primary Examiner* — Joseph J Dallo
(74) *Attorney, Agent, or Firm* — K&L Gates LLP

(57) ABSTRACT

A swirl chamber-type diesel engine includes a secondary combustion chamber assembly coupled to a cylinder head to define a secondary combustion chamber having, on an inner wall surface thereof, a curved swirl induction part, and a connecting passage formed at a lower end of the swirl induction part, and a piston defining a primary combustion chamber and including a trench part being in communication with the connecting passage, and clover parts formed at both sides of the trench part, in which a guide structure is provided in the connecting passage, and the guide structure divides combustion gas, discharged from the secondary combustion chamber to the primary combustion chamber, into three portions and guides the combustion gas.

8 Claims, 18 Drawing Sheets

(56) References Cited

U.S. PATENT DOCUMENTS

| | | | | |
|---|---|---|---|---|
| 5,305,720 A * | 4/1994 | Ando | ........................ | F02F 3/26 |
| | | | | 123/193.4 |
| 5,335,634 A * | 8/1994 | Hashimoto | ............. | F02B 23/08 |
| | | | | 123/188.14 |
| 5,836,284 A * | 11/1998 | Oda | ...................... | F02B 17/005 |
| | | | | 123/308 |
| 6,092,501 A * | 7/2000 | Matayoshi | ............ | F02F 1/4214 |
| | | | | 123/301 |
| 9,151,502 B2 * | 10/2015 | Crothers | ................ | F23D 14/02 |

FOREIGN PATENT DOCUMENTS

| JP | H08260978 A | 10/1996 |
|---|---|---|
| JP | 2002174123 A | 6/2002 |
| JP | 2002285846 A | 10/2002 |
| JP | 2005207312 A | 8/2005 |
| KR | 20-1998-044006 U | 9/1998 |
| KR | 10-1999-0004022 | 1/1999 |
| KR | 19990060748 A | 7/1999 |
| KR | 20020053242 A | 7/2002 |
| KR | 100729293 B1 | 6/2007 |

OTHER PUBLICATIONS

Korean Office Action for related Korean Application No. 10-2017-0110082; action dated Sep. 21, 2020; (5 pages).
International Search Report for related International Application No. PCT/KR2018/009235; report dated Mar. 7, 2019; (3 pages).
Written Opinion for related International Application No. PCT/KR2018/009235; report dated Mar. 7, 2019; (7 pages).

* cited by examiner

⇒ FLOW OF COMBUSTION GAS

⇒ FLOW OF COMBUSTION GAS

SECTION A-A

SECTION B-B

SECTION A-A

SECTION B-B

⇨ : FLOW OF COMBUSTION GAS

⇨ : FLOW OF COMBUSTION GAS

SWIRL CHAMBER-TYPE DIESEL ENGINE

CROSS REFERENCE TO RELATED APPLICATIONS

The present application is a National Stage of International Application No. PCT/KR2018/009235 filed on Aug. 13, 2018, which claims the benefit of Korean Patent Application No. 10-2017-0110082 filed on Aug. 30, 2017 and Korean Patent Application No. 10-2017-0122005 filed on Sep. 21, 2017 with the Korean Intellectual Property Office, the entire contents of each hereby incorporated by reference.

FIELD OF TECHNOLOGY

The present invention relates to a swirl chamber-type diesel engine and, more specifically, to a swirl chamber-type diesel engine provided with a guide structure in a connecting passage for connecting a secondary combustion chamber and a primary combustion chamber in the swirl chamber-type diesel engine, the guide structure being capable of dividing combustion gas, discharged from the secondary combustion chamber to the primary combustion chamber, into three portions and guiding the combustion gas, thereby facilitating diffusion combustion in the diesel engine and inhibiting harmful gas, such as smog, from being produced.

BACKGROUND

There is no great intrinsic difference between diesel engines and gasoline engines in terms of main structures (cylinder heads, cylinder blocks, piston connecting assemblies, crank shafts, cam shafts, and valve mechanisms) that convert thermal energy into mechanical energy.

However, there is a difference between the gasoline engine and the diesel engine in terms of processes of combusting fuel. While the gasoline engine compresses a gas mixture of air and fuel and then ignites the fuel by producing an electrical flame, the diesel engine ignites fuel by means of autoignition (compression ignition) by drawing only air, compressing the air at a high compression ratio so that a temperature of air is raised to 500 to 600° C. or higher, pressing the fuel with an injection pump, and then injecting the fuel into a cylinder from an injection nozzle.

A combustion chamber of the diesel engine needs to meet the following requirements. That is, the injected fuel needs to be completely combusted within a short period of time as quickly as possible, an average effective pressure needs to be high, and a fuel consumption rate needs to be low. In addition, a combustion state needs to be good even at a high rotational speed, the diesel engine needs to operate easily, and diesel knock needs to be less generated.

The injection nozzle is installed in the cylinder head and provided above the combustion chamber. The injection nozzle is a device configured to inject into the combustion chamber the finely atomized high-pressure fuel supplied from the injection pump. The fuel spray injected from the injection nozzle needs to be excellent in atomization and penetration properties and needs to be evenly injected and to have an appropriate injection degree and rate. A flow coefficient of the nozzle also needs to be accurate.

Based on the type of combustion chamber, diesel engines are classified as a direct-injection chamber-type diesel engine, which is a single chamber-type diesel engine; a pre-combustion chamber-type diesel engine, which is a double chamber-type diesel engine; and a swirl chamber-type diesel engine. The direct-injection chamber-type diesel engine has a structure in which a combustion chamber is defined by a cylinder head and a concave-convex portion provided on a piston head, and fuel is injected directly into the combustion chamber. The direct-injection chamber-type diesel engine is called a single chamber-type diesel engine because the direct-injection chamber-type diesel engine has only a primary combustion chamber. The combustion chamber has a heart shape, a spherical shape, a hemispheric shape, or the like.

The pre-combustion chamber-type diesel engine has a structure in which a combustion chamber is provided above a primary combustion chamber formed between a piston and a cylinder head; part of injected fuel is combusted in the pre-combustion chamber to produce high-temperature, high-pressure gas; and the remaining part of the fuel is injected into the primary combustion chamber and then completely combusted by the high-temperature, high-pressure gas.

The swirl chamber-type diesel engine has a swirl chamber provided in a cylinder or a cylinder head, such that a swirl is generated in the swirl chamber in a compression stroke. When fuel is injected into the swirl chamber, the injected fuel is ignited and combusted by being mixed with swirling air and then discharged into a primary combustion chamber. Further, in the primary combustion chamber, noncombusted fuel is combusted by being mixed with new air.

FIG. 1 is a view illustrating an internal structure of a combustion chamber of a swirl chamber-type diesel engine in the related art. FIG. 1 mainly illustrates a structure of a secondary combustion chamber (swirl chamber) 2a.

Referring to FIG. 1, the secondary combustion chamber 2a is provided as a secondary combustion chamber assembly 2 is separately assembled in a cylinder head 1. A primary combustion chamber 3a is formed in an upper surface of a piston 3. In the cylinder head 1, an injection nozzle 4 is provided at a center upper end of the secondary combustion chamber 2a so as to eccentrically inject fuel into the secondary combustion chamber 2a. A glowplug 5 is mounted at an upper end of the secondary combustion chamber 2a. The glowplug 5 is installed because a temperature in the combustion chamber is low when the engine starts or operates at a low speed. A connecting passage 2b is inclinedly provided at a lower end of the secondary combustion chamber 2a, and the air is introduced from the primary combustion chamber 3a through the connecting passage 2b. The connecting passage 2b is mainly provided in a direction tangential to the secondary combustion chamber 2a. Further, a coolant passage 1a is formed at the periphery of the secondary combustion chamber 2a.

In the compression stroke in the swirl chamber-type combustion chamber configured as described above, a strong swirl is generated, as indicated by the arrows (A in FIG. 1), when compressed air introduced from the primary combustion chamber 3a flows into the secondary combustion chamber 2a through the connecting passage 2b. At this time, the fuel is injected from the injection nozzle 4, and the fuel is mostly combusted in the secondary combustion chamber 2a.

The swirl chamber-type combustion chamber in the related art is a Comet Vb type invented by Ricardo. In particular, as illustrated in FIG. 2, the shape of the secondary combustion chamber assembly 2 may include a fuel collision part 2c having a straight cross-sectional shape with which the fuel injected from the injection nozzle 4 collides and a swirl induction part 2d having a curved shape. In this case, the connecting passage 2b is structured to be tangential to the swirl induction part 2d. In particular, as illustrated in FIG. 2, the shape of the connecting passage 2b has a one-piece cross-sectional shape defining an arc tangential to two circles.

Because of the shape of the connecting passage 2b structured as described above, diffusion of the combusted gas mixture is concentrated in a straight direction when the gas mixture combusted in the secondary combustion chamber 2a is discharged into the primary combustion chamber 3a. For this reason, swirls cannot be appropriately formed in the left and right clover parts, which causes a deterioration in diffusion combustion and an increase in emission of harmful substances in exhaust gas, particularly smog.

The present invention has been made in an effort to solve the aforementioned problems, and an object of the present invention is to provide a swirl chamber-type diesel engine that divides a gas mixture, discharged from a secondary combustion chamber 2a to a primary combustion chamber 3a, into three portions and guides and discharges the gas mixture, thereby facilitating diffusion in a straight direction and promoting swirls in left and right clover parts, and thus effectively inhibiting the production of harmful substances, such as smog, included in exhaust gas.

The detailed objects of the present invention will be apparently identified and understood by experts or researchers in this technical field through the specific description disclosed below.

SUMMARY

In order to achieve the aforementioned object, a swirl chamber-type diesel engine according to an exemplary embodiment of the present invention includes a secondary combustion chamber assembly 2 coupled to a cylinder head 1 to define a secondary combustion chamber 2a having, on an inner wall surface thereof, a curved swirl induction part 2d, a connecting passage 2b formed at a lower end of the swirl induction part 2d, a piston 3 defining a primary combustion chamber 3a and including a trench part 3c being in communication with the connecting passage 2b, and clover parts 3b formed at both sides of the trench part 3c, in which a guide structure 2e is provided in the connecting passage 2b, and the guide structure 2e divides combustion gas, discharged from the secondary combustion chamber 2a to the primary combustion chamber 3a, into three portions and guides the combustion gas.

In this case, the three portions of the combustion gas, which are divided and guided by the guide structure 2e, may be guided to be introduced into the trench part 3c in a straight direction or introduced into the clover parts 3b at both sides of the trench part 3c.

In addition, the guide structure 2e may include three curved shapes provided on an upper surface of the connecting passage 2b and disposed adjacent to one another.

In this case, the three curved shapes provided on the upper surface of the connecting passage 2b may have the same shape throughout the connecting passage 2b.

In this case, the three curved shapes provided on the upper surface of the connecting passage 2b may have the same radius.

In addition, the guide structure 2e may include a first guide groove 21e positioned at a center thereof and second and third guide grooves 22e and 23e positioned at both sides of the first guide groove 21e, and a center of the first guide groove 21e may be positioned at a higher position than a straight line that connects a center of the second guide groove 22e and a center of the third guide groove 23e.

In addition, the guide structure 2e may include a first guide groove 21e positioned at a center thereof and second and third guide grooves 22e and 23e positioned at both sides of the first guide groove 21e, and a distance D between the second guide groove 22e and the third guide groove 23e may be three times a radius r of the first guide groove 21e (D=3r).

Further, the guide structure 2e may include a first guide groove 21e positioned at a center thereof and second and third guide grooves 22e and 23e positioned at both sides of the first guide groove 21e, and the first guide groove 21e may be positioned at a higher position than the second guide groove 22e and the third guide groove 23e.

Here, the first guide groove 21e, the second guide groove 22e, and the third guide groove 23e may approximately uniformly divide the combustion gas and guide the combustion gas.

In this case, the first guide groove 21e, the second guide groove 22e, and the third guide groove 23e may have the same cross-sectional area.

Further, a bottom surface of the clover part 3b may have a stereoscopic structure in which a height of a bottom surface in a second region, which is distant in a direction of a flow of the combustion gas at a predetermined distance from a first region into which the combustion gas is introduced from the trench part 3c, is greater than a height of a bottom surface in the first region.

In this case, the bottom surface of the clover part 3b may have a stereoscopic structure in which the height of the bottom surface is gradually increased in the direction of the flow of the combustion gas so that the introduced combustion gas flows while being gradually raised.

In addition, the clover parts 3b may have cylindrical structures disposed adjacent to both sides of the trench part 3c, and each may include a spiral structure in which the height of the bottom surface is gradually increased in the direction of the flow of the combustion gas.

Further, the clover part 3b may have a structure in which the height of the bottom surface is gradually increased toward an outer periphery thereof.

In addition, the bottom surface of the trench part 3c may have a predetermined gradient so that the combustion gas to be introduced into the clover part 3b is introduced while being raised.

The swirl chamber-type diesel engine according to the exemplary embodiment of the present invention is provided with the guide structure in the connecting passage for connecting the secondary combustion chamber and the primary combustion chamber in the swirl chamber-type diesel engine, and the guide structure may divide combustion gas into three portions and guide the combustion gas. Since the combustion gas discharged from the secondary combustion chamber to the primary combustion chamber is divided, guided, and discharged, it is possible to facilitate diffusion combustion in the diesel engine and to inhibit the production of harmful gas, such as smog.

Further, in the swirl chamber-type diesel engine according to the exemplary embodiment of the present invention, each of the bottom surfaces of the clover parts positioned at the periphery of the trench part in the primary combustion chamber of the swirl chamber-type diesel engine is implemented to have a helical stereoscopic structure, as a result of which it is possible to improve the oxidation capability of the diesel engine and to effectively inhibit the production of harmful substances such as particulate matters (PM) included in exhaust gas.

BRIEF DESCRIPTION OF THE DRAWINGS

The accompanying drawings included as a part of the detailed description for helping to understand the present invention provide exemplary embodiments of the present invention, and the technical spirit of the present invention will be described with reference to the detailed description.

DETAILED DESCRIPTION

Figure 1:
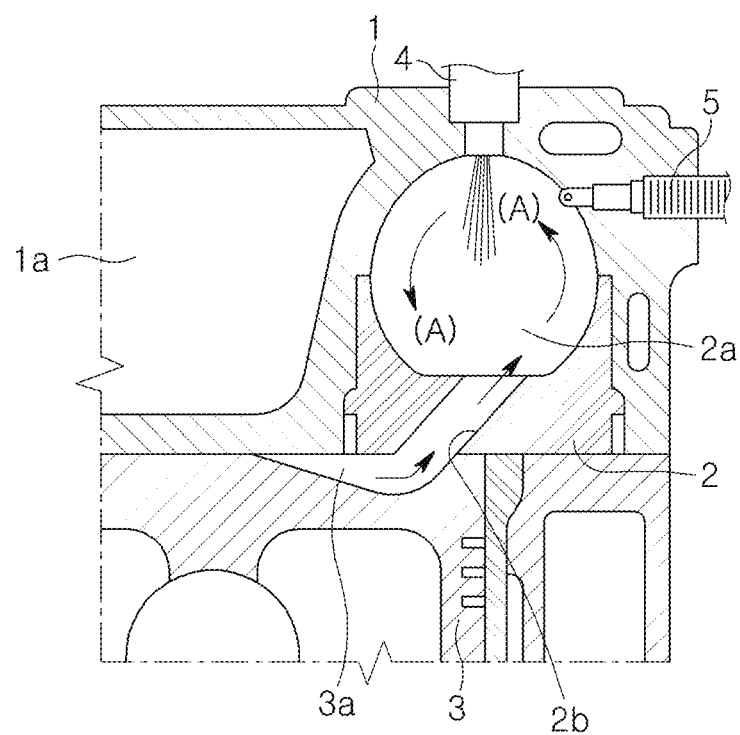
FIG. 1 is an exemplified view illustrating a structure of a combustion chamber of a typical swirl chamber-type diesel engine.
Figure 2:
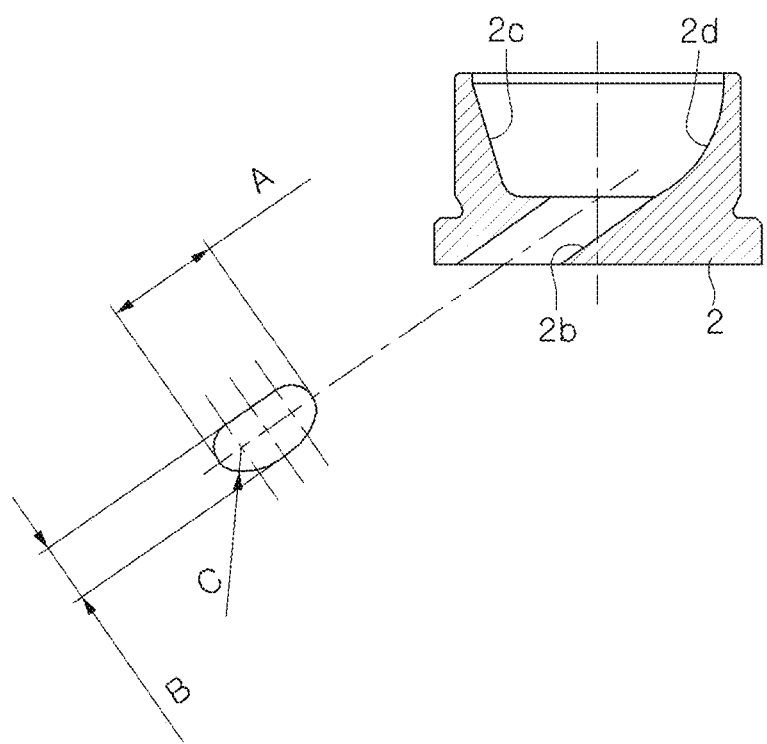
FIG. 2 is an exemplified view illustrating a secondary combustion chamber assembly 2 that defines a secondary combustion chamber 2a in the typical swirl chamber-type diesel engine.

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be carried out by those skilled in the art.

First, a configuration and an operation of a general swirl chamber-type diesel engine will be schematically described with reference to FIGS. 3A and 3B and then technical features of the present invention will be described.

More specifically, there is enough time to form a gas mixture in medium and large diesel engines, and thus the contact between fuel and air may be sufficiently achieved only by injecting the fuel. However, in a small or high-speed diesel engine, it is difficult to complete combustion in a short period of time without the aid of a swirl of air. In order to solve this problem, various types of combustion chamber structures, such as a swirl chamber-type combustion chamber structure, are used. In particular, a swirl chamber-type diesel engine is structured to combust fuel by injecting the fuel into a swirl formed in a secondary combustion chamber 2a in a compression stroke.

Figure 3A:
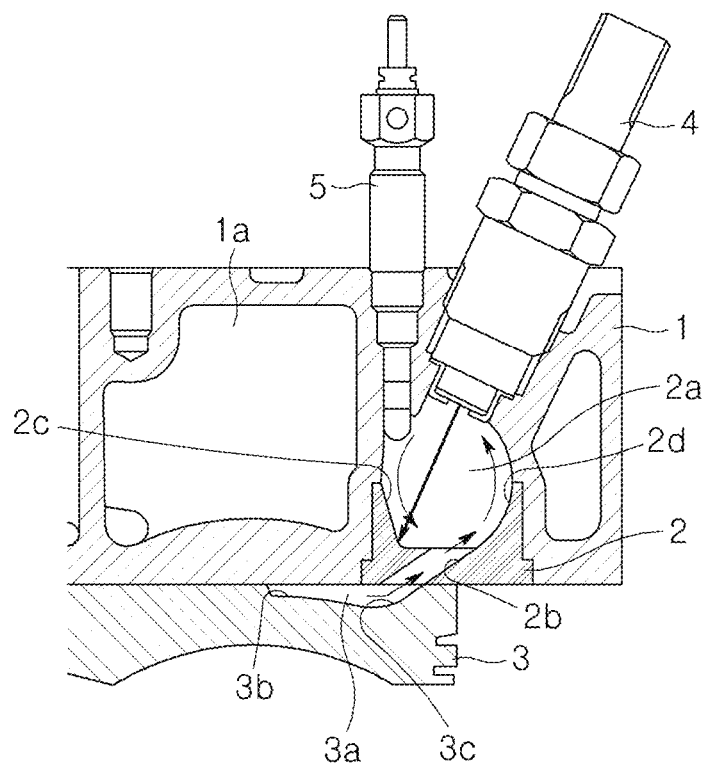
FIGS. 3A and 3B are views for explaining a structure of a combustion chamber of a swirl chamber-type diesel engine according to an exemplary embodiment of the present invention.

As illustrated in FIG. 3A, the swirl chamber-type diesel engine may generally include a primary combustion chamber 3a and the secondary combustion chamber 2a. In this case, the secondary combustion chamber 2a may be formed as a secondary combustion chamber assembly 2 is provided in a cylinder head 1.

In addition, the primary combustion chamber 3a may be formed in an upper surface of a piston 3.

An injection nozzle 4 is provided at an upper end of a center of the secondary combustion chamber 2a, and the injection nozzle 4 may eccentrically inject the fuel toward a fuel collision part 2c formed on one side wall surface of the secondary combustion chamber 2a and having a straight cross-sectional shape. In addition, a swirl induction part 2d having a curved shape is provided on the other side wall surface of the secondary combustion chamber 2a and forms a swirl when compressed air introduced from the primary combustion chamber 3a flows to the secondary combustion chamber 2a via a connecting passage 2b.

In addition, the connecting passage 2b may be inclinedly formed at a lower end of the secondary combustion chamber 2a, and the connecting passage 2b connects the secondary combustion chamber 2a and the primary combustion chamber 3a and provides a passageway through which air is introduced from the primary combustion chamber 3a to the secondary combustion chamber 2a. The connecting passage 2b may be provided mainly in a direction tangential to the swirl induction part 2d of the secondary combustion chamber 2a.

Further, a glowplug 5 is provided in the secondary combustion chamber 2a to prevent a temperature in the combustion chamber from being lowered when the engine starts or operates at a low speed. Further, a coolant passage 1a may be formed at the periphery of the secondary combustion chamber 2a.

Figure 3B:
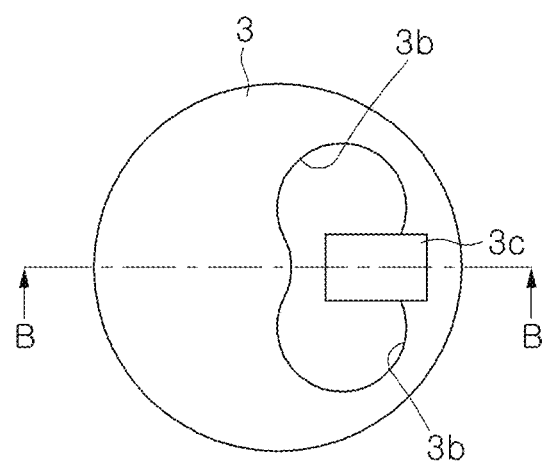

When combustion gas formed in the secondary combustion chamber 2a is discharged to the primary combustion chamber 3a in the general swirl chamber-type diesel engine, diffusion of the combustion gas flowing to a trench part 3c in FIG. 3B is concentrated in a straight direction. For this reason, swirls cannot be appropriately formed in clover parts 3b positioned at both sides of the trench part 3c, which may cause a deterioration in diffusion combustion and a problem of an increase in emission of harmful substances in exhaust gas, particularly smog.

More specifically, referring to FIGS. 3A, 3B, 4A, and 4B, in the typical swirl chamber-type diesel engine in the related art, the secondary combustion chamber 2a may be formed as the secondary combustion chamber assembly 2 is provided in the cylinder head 1. The secondary combustion chamber 2a is connected to the primary combustion chamber 3a via the connecting passage 2b, such that the combustion gas formed in the secondary combustion chamber 2a is discharged into the primary combustion chamber 3a.

Figure 4A:
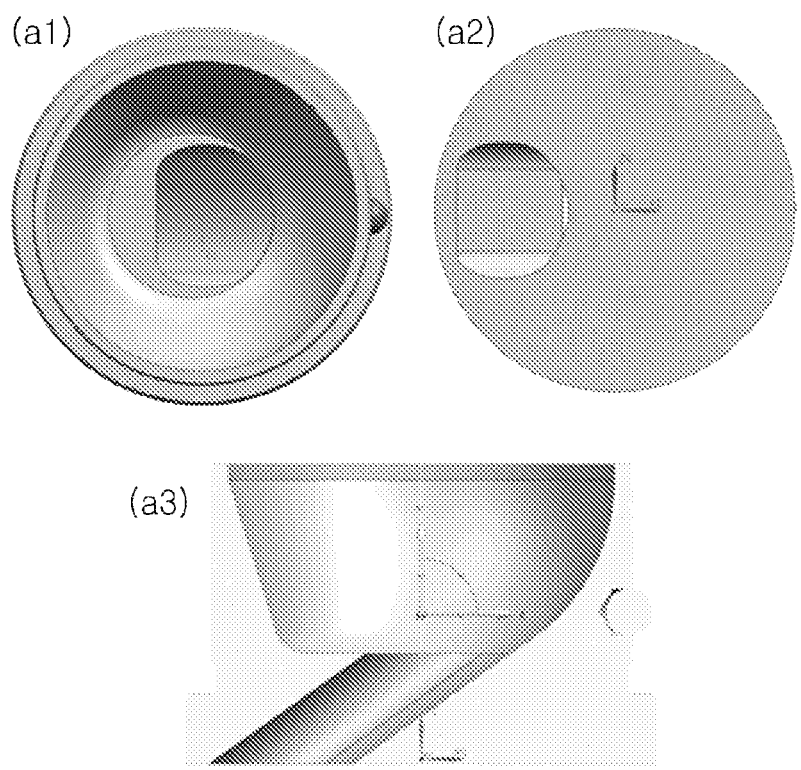
FIGS. 4A and 4B are views illustrating the swirl chamber-type diesel engine provided with a connecting passage 2b having a general structure.
Figure 4B:
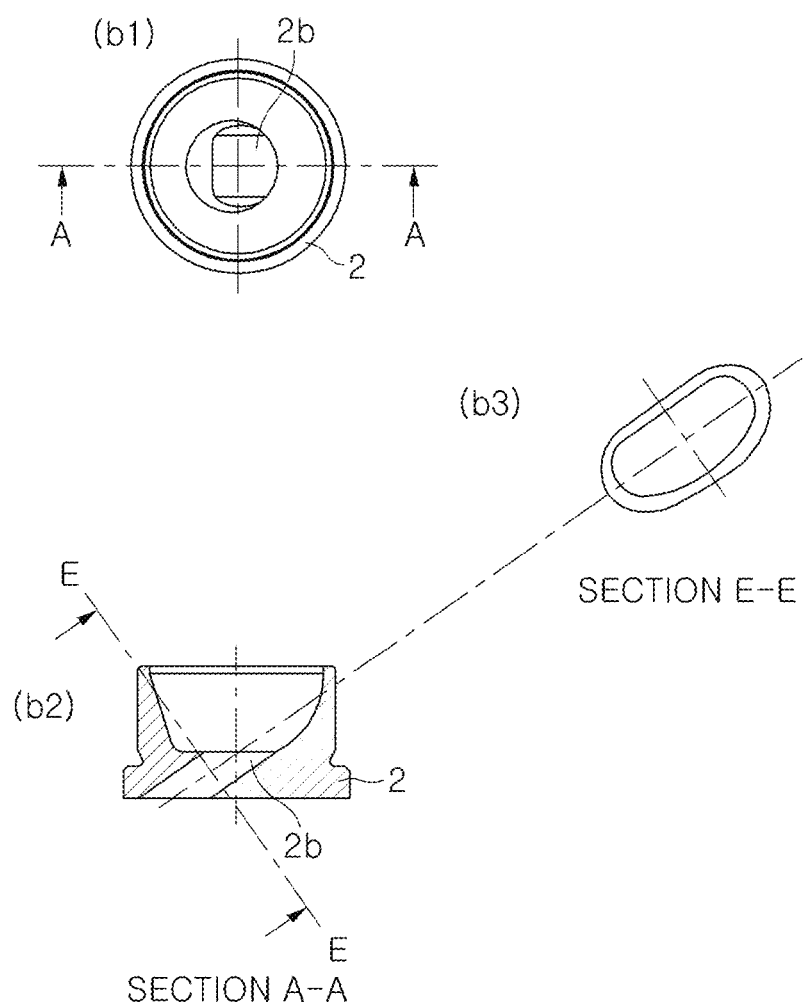

FIG. 4A illustrates a shape of the secondary combustion chamber assembly 2, which defines the secondary combustion chamber 2a, and a shape of the connecting passage 2b when viewed from an upper side (a1), a lower side (a2), and a lateral side (a3). In addition, FIG. 4B is a cross-sectional view illustrating the shape of the secondary combustion chamber assembly 2, which defines the secondary combustion chamber 2a and the shape of the connecting passage 2b. More specifically, FIG. 4B (b3) concretely illustrates a cross-sectional shape of the connecting passage 2b.

In particular, as illustrated in FIG. 4B (b3), the connecting passage 2b for connecting the primary combustion chamber 3a and the secondary combustion chamber 2a of the swirl chamber-type diesel engine in the related art has a one-piece cross-sectional shape defining an arc tangential to two circles. In this case, when the gas mixture combusted in the secondary combustion chamber 2a is discharged to the primary combustion chamber 3a, diffusion of the combustion gas introduced into the trench part (3c in FIG. 3B) is concentrated in a straight direction. For this reason, swirls cannot be appropriately formed in the clover parts (3b in FIG. 3B) positioned at both sides of the trench part 3c, which may cause a deterioration in diffusion combustion and a problem of an increase in emission of harmful substances in exhaust gas, particularly smog.

Figure 5A:
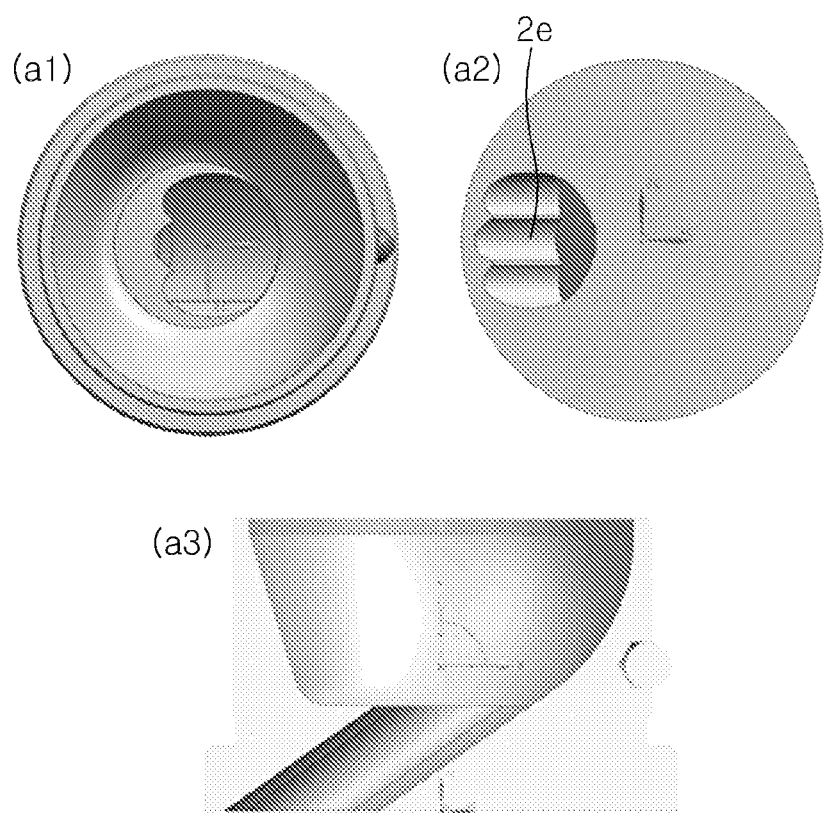
FIGS. 5A and 5B are views illustrating features of the swirl chamber-type diesel engine provided with the connecting passage 2b according to the exemplary embodiment of the present invention.
Figure 5B:
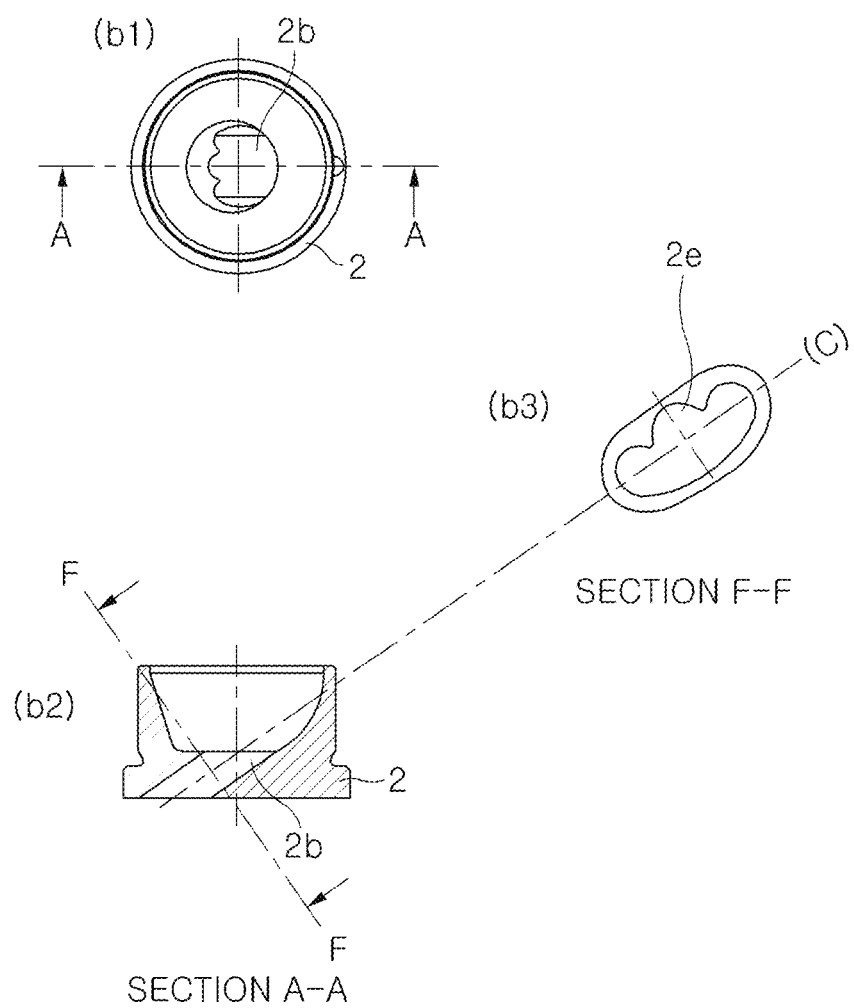

In contrast, FIGS. 5A and 5B specifically illustrate features of the swirl chamber-type diesel engine provided with the connecting passage 2b according to the exemplary embodiment of the present invention.

FIG. 5A illustrates a shape of the secondary combustion chamber assembly 2, which defines the secondary combustion chamber 2a, and a shape of the connecting passage 2b when viewed from an upper side (a1), a lower side (a2), and a lateral side (a3) in the swirl chamber-type diesel engine provided with the connecting passage 2b according to the exemplary embodiment of the present invention.

In addition, FIG. 5B is a cross-sectional view illustrating the shape of the secondary combustion chamber assembly 2, which defines the secondary combustion chamber 2a and the shape of the connecting passage 2b in the swirl chamber-type diesel engine provided with the connecting passage 2b according to the exemplary embodiment of the present invention. More specifically, FIG. 5B (b3) concretely illustrates a cross-sectional shape of the connecting passage 2b.

In particular, as illustrated in FIG. 5A (a2) and FIG. 5B (b3), a guide structure 2e may be provided in the connecting passage 2b for connecting the primary combustion chamber 3a and the secondary combustion chamber 2a of the swirl chamber-type diesel engine according to the exemplary embodiment of the present invention, and the guide structure 2e may divide the combustion gas, discharged from the secondary combustion chamber 2a to the primary combustion chamber 3a, into three portions and guide the combustion gas.

Figure 6:
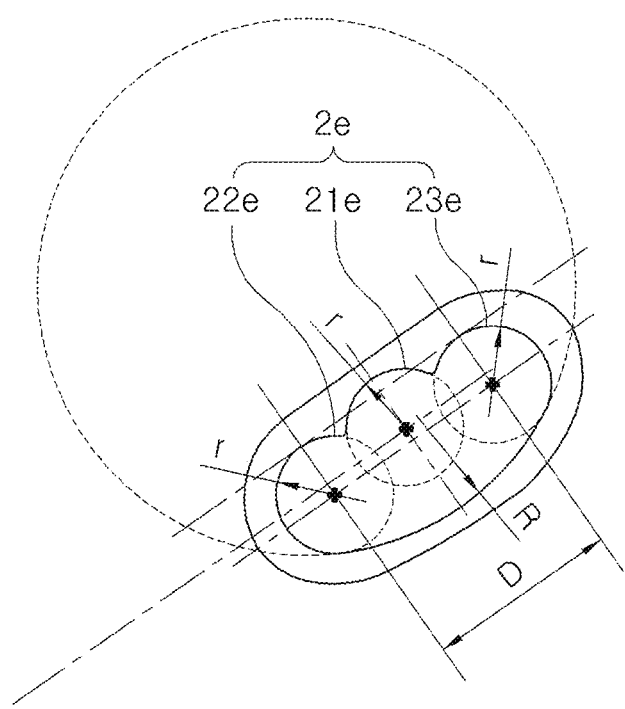
FIGS. 6, 7A, 7B, and 7C are views for explaining the connecting passage 2b according to the exemplary embodiment of the present invention.

Further, FIG. 6 is a cross-sectional view illustrating the guide structure 2e formed in the connecting passage 2b in order to explain the connecting passage 2b according to the exemplary embodiment of the present invention.

As illustrated in FIG. 6, the guide structure 2e may include three curved shapes provided on an upper surface of the connecting passage 2b. With the shape of the guide structure 2e, the combustion gas may be divided into the three portions and then guided.

In this case, the guide structure 2e may have the three curved shapes provided on the upper surface of the connecting passage 2b and have the same radius.

More specifically, the three portions of the combustion gas, which are divided and guided by the guide structure 2e, may be introduced into the trench part 3c in the straight direction or introduced into the clover parts 3b positioned at both sides of the trench part 3c. Therefore, in the present invention, with the use of the guide structure 2e configured to guide the combustion gas while dividing the combustion gas into the three portions and provided in the connecting passage 2b for connecting the secondary combustion chamber 2a and the primary combustion chamber 3a, the combustion gas, discharged from the secondary combustion chamber 2a to the primary combustion chamber 3a, may be divided into the three portions and then discharged. In contrast to the related art in which the combustion gas is concentrated into the trench part 3c in the straight direction and swirls cannot be appropriately formed in the left and right clover parts 3b, the diffusion combustion in the diesel engine may be facilitated and the production of harmful gas, such as smog, may be effectively inhibited as the proportion of the combustion gas to be discharged into the trench part 3c and the clover parts 3b is adjusted by the guide structure 2e.

Further, the guide structure 2e has the three curved shapes adjacent to one another on the upper surface of the connecting passage 2b, and the guide structure 2e may have a first guide groove 21e positioned at a center, and second and third guide grooves 22e and 23e positioned at both sides of the first guide groove 21e.

In this case, a center of the first guide groove 21e may be positioned at a higher position than a straight line that connects a center of the second guide groove 22e and a center of the third guide groove 23e. That is, as illustrated in FIG. 6, based on a centerline (C in FIG. 5B) of the connecting passage 2b, the first guide groove 21e may be positioned at a higher position than the second guide groove 22e and the third guide groove 23e. Therefore, as illustrated in FIG. 5B (b3), based on the centerline (C in FIG. 5B) of the connecting passage 2b, the first guide groove 21e protrudes most outward so as to be positioned at the high position.

Further, the first guide groove 21e is positioned at the center between the second guide groove 22e and the third guide groove 23e, and the first guide groove 21e has the same cross-sectional area as the second guide groove 22e and the third guide groove 23e, such that the first guide groove 21e, the second guide groove 22e, and the third guide groove 23e may divide and guide the combustion gas.

Further, the first guide groove 21e, the second guide groove 22e, and the third guide groove 23e may have the same radius or the same cross-sectional area, such that the combustion gas may be approximately uniformly divided and guided, thereby uniformly discharging the combustion gas, which was concentrated into the trench part 3c, to the trench part 3c and the clover parts 3b positioned at both ends of the trench part 3c.

That is, in the present invention, the configuration in which the first guide groove 21e, the second guide groove 22e, and the third guide groove 23e approximately uniformly divide the combustion gas and guide the combustion gas means that the first guide groove 21e, the second guide groove 22e, and the third guide groove 23e have the same radius or the same cross-sectional area such that the amount of combustion gas to be discharged into the clover parts 3b positioned at both sides of the trench part 3c may be increased to be equal to the amount of the combustion gas to be discharged into the trench part 3c, in contrast to the related art in which the combustion gas is mostly concentrated and discharged into the trench part 3c from the connecting passage 2b.

In particular, a distance (D in FIG. 6) between the second guide groove 22e and the third guide groove 23e is three times a radius (r in FIG. 6) of the first guide groove 21e (D=3r), and the proportion of the combustion gas to be discharged into the trench part 3c and the clover parts 3b is optimized, such that swirls may be efficiently formed in the clover parts 3b, diffusion combustion may be facilitated, and the production of harmful substances, such as smog, in exhaust gas may be effectively inhibited.

Further, the proportion of the combustion gas to be guided by the first guide groove 21e may be adjusted by adjusting the cross-sectional area of the first guide groove 21e by adjusting the height of the first guide groove 21e. Furthermore, it is possible to appropriately adjust the proportion of the combustion gas to be introduced into the trench part 3c in the straight direction and the combustion gas introduced into the clover parts 3b positioned at both sides of the trench part 3c.

Figure 7A:
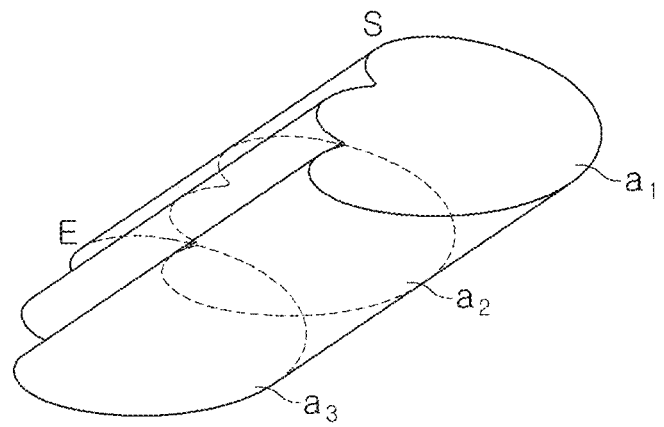
Figure 7B:
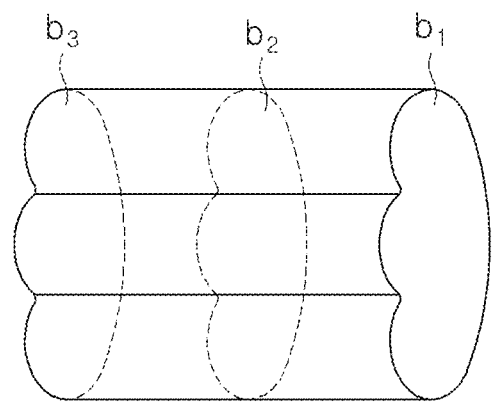
Figure 7C:
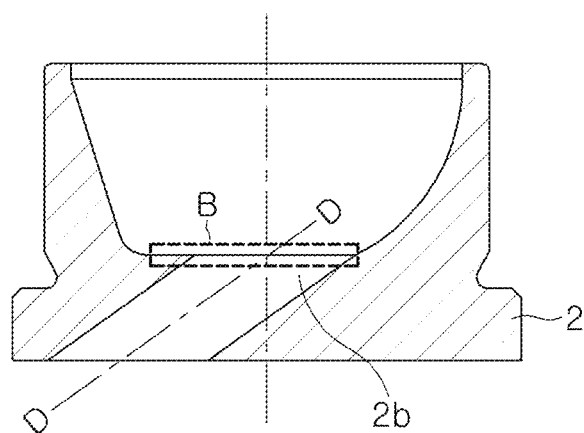

Further, FIGS. 7A, 7B, and 7C illustrate the internal structure of the connecting passage 2b in order to explain the connecting passage 2b according to the exemplary embodiment of the present invention.

As illustrated in FIG. 7A, the connecting passage 2b has a shape constant from a start point S to an end point E. All cross sections a1, a2, and a3 parallel to a lower surface (surface B in FIG. 7C) of the secondary combustion chamber assembly 2 have the same shape.

Further, as illustrated in FIG. 7B, all cross sections b1, b2, and b3 perpendicular to a central axis (D-D in FIG. 7C) in a running direction of the connecting passage 2b also have the same shape.

Figure 8A:
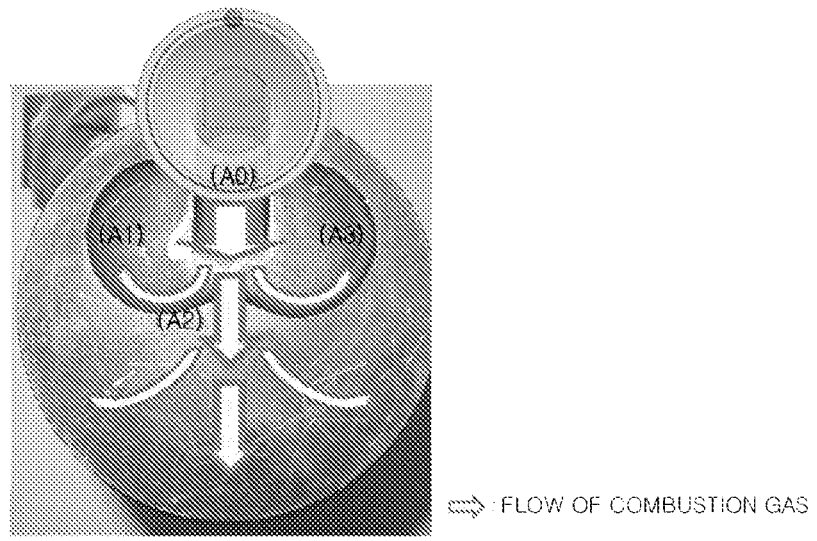
FIGS. 8A and 8B are views for explaining the improvement of a flow of combustion gas in accordance with the connecting passage 2b in the swirl chamber-type diesel engine according to the exemplary embodiment of the present invention.
Figure 8B:
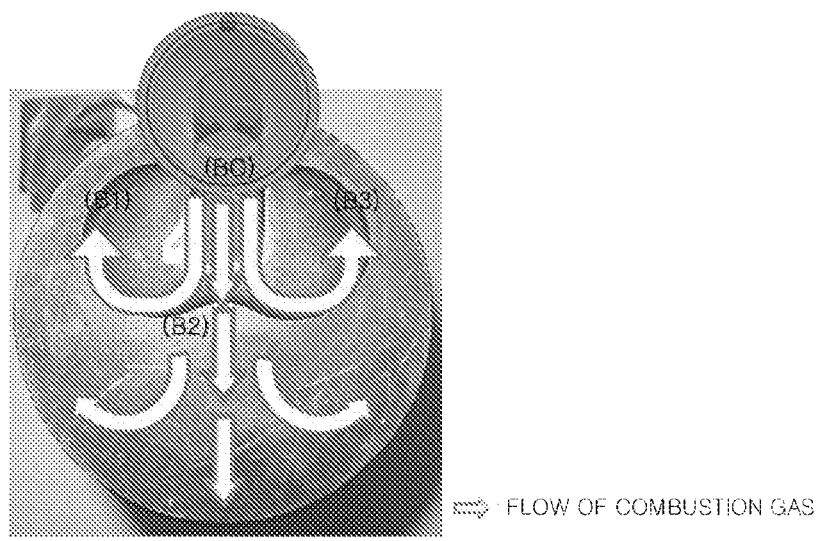

FIGS. 8A and 8B illustrate the improvement of a flow of combustion gas in the swirl chamber-type diesel engine provided with the connecting passage 2b according to the exemplary embodiment of the present invention. First, as illustrated in FIG. 8A, when combustion gas formed in the secondary combustion chamber 2a is discharged to the primary combustion chamber 3a in the typical swirl chamber-type diesel engine in the related art (A0 in FIG. 8A), diffusion of the combustion gas introduced to the trench part 3c is concentrated in the straight direction (A2 in FIG. 8A). For this reason, swirls cannot be appropriately formed in the clover parts 3b positioned at both sides of the trench part 3c (A1 and A3 in FIG. 8A), which may cause a deterioration in diffusion combustion and a problem of an increase in emission of harmful substances in exhaust gas, particularly smog.

In contrast, in the swirl chamber-type diesel engine according to the exemplary embodiment of the present invention, with the use of the guide structure 2e configured to guide the combustion gas while dividing the combustion gas into the three portions and provided in the connecting passage 2b for connecting the secondary combustion chamber 2a and the primary combustion chamber 3a, the combustion gas, discharged from the secondary combustion chamber 2a to the primary combustion chamber 3a, may be divided into the three portions and then discharged (B0 in FIG. 8B), such that the combustion gas may be divided and discharged in accordance with the appropriate proportion of the combustion gas (B2 in FIG. 8B) to be introduced into the trench part 3c in the straight direction and the combustion gas (B1 and B3 in FIG. 8B) to be introduced into the clover parts 3b positioned at both sides of the trench part 3c.

Therefore, in the swirl chamber-type diesel engine according to the exemplary embodiment of the present invention, the swirls are more strongly formed in the clover parts 3b positioned at both sides of the trench part 3c, as a result of which it is possible to facilitate diffusion combustion in the diesel engine and to effectively inhibit the production of harmful gas, such as smog.

In addition, in the swirl chamber-type diesel engine according to the exemplary embodiment of the present invention, each of the bottom surfaces of the clover parts 3b positioned at the periphery of the trench part 3c in the primary combustion chamber 3a of the swirl chamber-type diesel engine is implemented to have a helical stereoscopic structure, as a result of which it is possible to improve the oxidation capability of the diesel engine and to effectively inhibit the production of harmful substances, such as PM, included in exhaust gas.

That is, in the swirl chamber-type diesel engine in the related art, when the combustion gas produced in the secondary combustion chamber 2a is discharged to the primary combustion chamber 3a, the swirls cannot be appropriately formed in the clover parts 3b, and complicated flows cannot be activated, which may cause a deterioration in oxidation capability and thus a problem of an increase in emission of harmful substances, particularly PM, in exhaust gas.

Figure 9A:
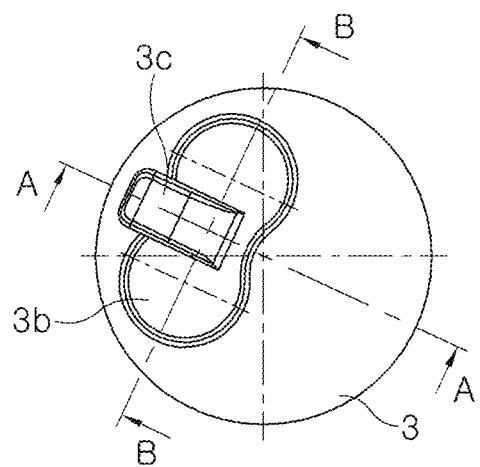
FIGS. 9A, 9B, and 9C are views illustrating a structure of a primary combustion chamber of a general swirl chamber-type diesel engine.
Figure 9B:
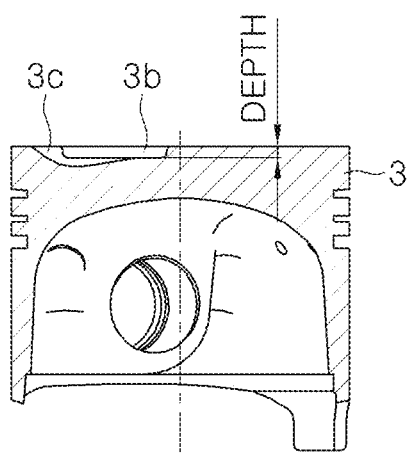
Figure 9C:
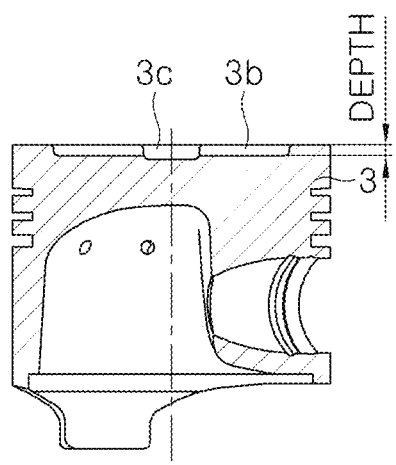

More specifically, referring to FIG. 9A, in the typical swirl chamber-type diesel engine in the related art, the clover parts 3b of the primary combustion chamber 3a may be disposed adjacent to left and right sides of the trench part 3c. In particular, as illustrated in FIGS. 9B and 9C, a bottom surface of the clover part 3b has a flat surface structure having a constant depth. For this reason, a swirl of the combustion gas cannot be effectively formed in the clover part 3b, and complete combustion cannot be achieved, and as a result, exhaust gas, including harmful substances such as PM, is produced.

Figure 10A:
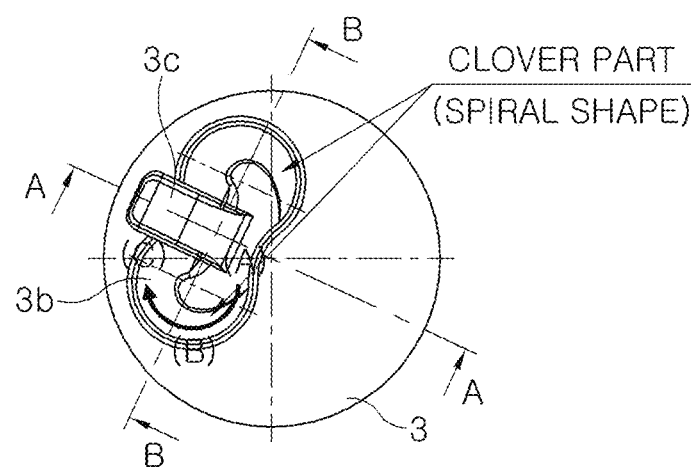
FIGS. 10A, 10B, and 10C are views illustrating a structure of a primary combustion chamber of the swirl chamber-type diesel engine according to the exemplary embodiment of the present invention.
Figure 10B:
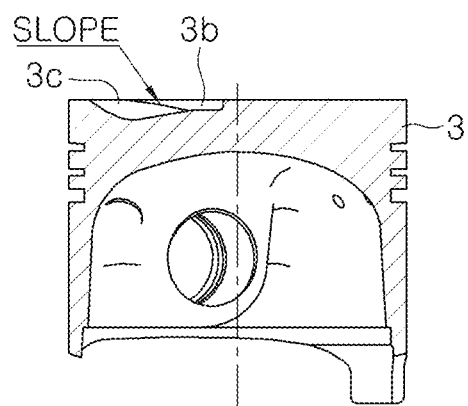
Figure 10C:
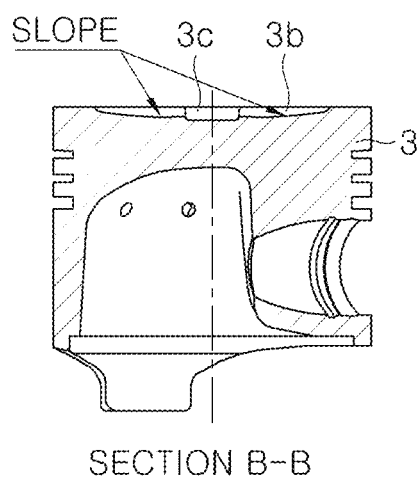

In contrast, as illustrated in FIGS. 10A, 10B, and 10C, in the primary combustion chamber 3a of the swirl chamber-type diesel engine according to the exemplary embodiment of the present invention, a bottom surface of the clover part 3b has a stereoscopic structure in which a height of a bottom surface of a second region (C in FIG. 10A), which is distant in a direction (indicated by the arrow B in FIG. 10A) of the flow of the combustion gas at a predetermined distance from a first region (A in FIG. 10A) into which the combustion gas is introduced from the trench part 3c is greater than a height of a bottom surface of the first region. As a result, a strong swirl may be formed in the clover part 3b, complicated flows may be activated, and the oxidation capability may be improved, the result of which it is possible to effectively inhibit emission of harmful substances, particularly PM, in exhaust gas.

That is, the swirl chamber-type diesel engine according to the exemplary embodiment of the present invention is the swirl chamber-type diesel engine including: the secondary combustion chamber assembly 2 coupled to the cylinder head 1 to define the secondary combustion chamber 2a having, on the inner wall surface thereof, the curved swirl induction part 2d, and the connecting passage 2b formed at the lower end of the swirl induction part 2d; the piston 3 defining the primary combustion chamber 3a and including the trench part 3c being in communication with the connecting passage 2b; and the clover parts 3b formed at the left and right sides of the trench part 3c, in which the bottom surface of the clover part 3b has the stereoscopic structure in which the height of the bottom surface of the second region (C in FIG. 10A), which is distant in the direction (indicated by the arrow B in FIG. 10A) of the flow of the combustion gas at the predetermined distance from the first region (A in FIG. 10A) into which the combustion gas is introduced from the trench part 3c is greater than the height of the bottom surface of the first region.

Further, referring to FIGS. 10B and 10C, in the primary combustion chamber 3a of the swirl chamber-type diesel engine according to the exemplary embodiment of the present invention, the bottom surface of the clover part 3b does not have the flat surface structure but has the stereoscopic structure in which the height of the bottom surface is gradually increased in the direction of the flow of the combustion gas.

Therefore, the combustion gas introduced into the clover part 3b flows while being raised along the shape of the bottom surface of the clover part 3b, thereby forming a stronger swirl.

More specifically, the features of the primary combustion chamber 3a of the swirl chamber-type diesel engine according to the exemplary embodiment of the present invention in comparison with the general swirl chamber-type diesel engine will be described in detail with reference to FIGS. 11A, 11B, 11C, 12A, 12B, and 12C.

Figure 11A:
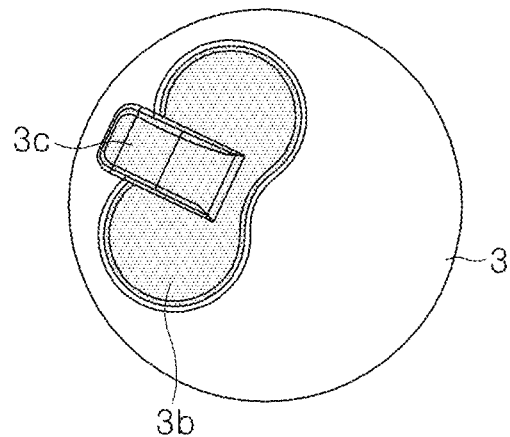
FIGS. 11A, 11B, and 11C are views for explaining features of a primary combustion chamber of a general swirl chamber-type diesel engine.
Figure 11B:
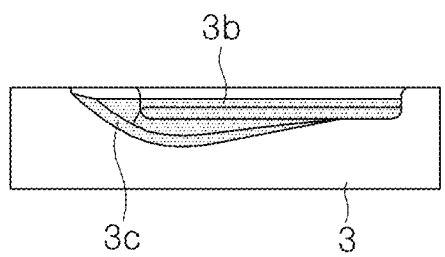
Figure 11C:
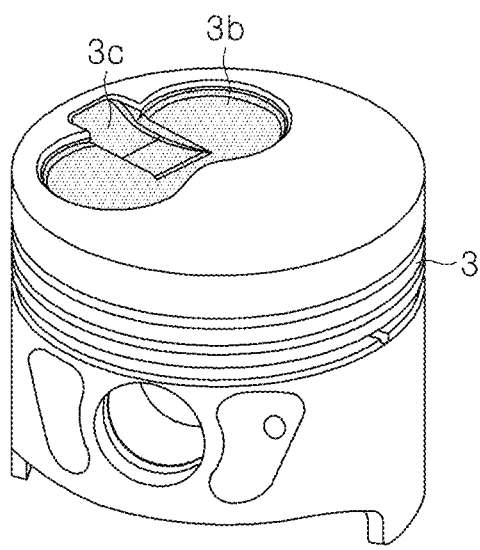

First, FIG. 11A is a top plan view, FIG. 11B is a cross-sectional side view, and FIG. 11C is a perspective view illustrating the shape of the primary combustion chamber 3a formed in the upper surface of the piston 3 of the general swirl chamber-type diesel engine.

In particular, as illustrated in FIGS. 11B and 11C, the clover part 3b of the primary combustion chamber 3a of the general swirl chamber-type diesel engine has the flat surface structure in which the bottom surface of the clover part 3b has the constant depth. As a result, when the gas mixture combusted in the secondary combustion chamber 2a is discharged to the primary combustion chamber 3a, a swirl of the combustion gas cannot be effectively formed in the clover part 3b, and complete combustion cannot be achieved, which causes a problem of production of exhaust gas, including harmful substances such as PM.

Figure 12A:
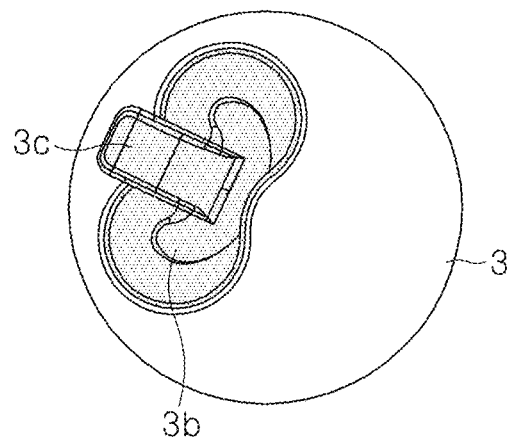
FIGS. 12A, 12B, and 12C are views for explaining features of the primary combustion chamber of the swirl chamber-type diesel engine according to the exemplary embodiment of the present invention.
Figure 12B:
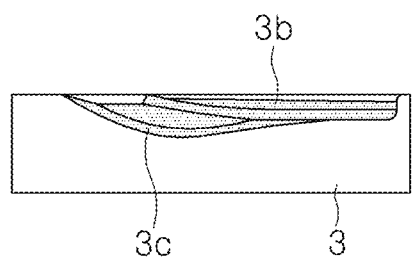
Figure 12C:
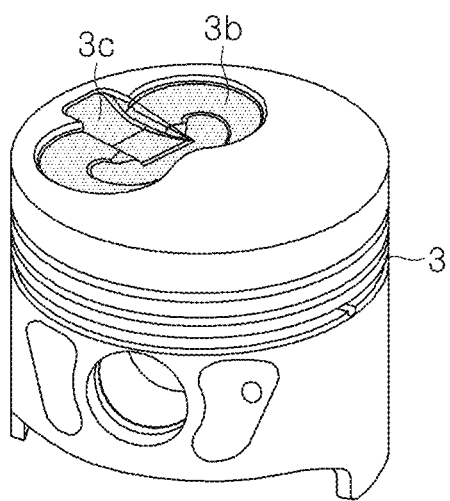

In contrast, FIGS. 12A, 12B, and 12C specifically illustrate features of the swirl chamber-type diesel engine according to the exemplary embodiment of the present invention.

More specifically, FIG. 12A is a top plan view, FIG. 12B is a cross-sectional side view, and FIG. 12C is a perspective view illustrating the shape of the primary combustion chamber 3a formed in the upper surface of the piston 3 of the swirl chamber-type diesel engine according to the exemplary embodiment of the present invention.

In particular, as illustrated in FIGS. 12B and 12C, the bottom surface of the clover part 3b of the primary combustion chamber 3a of the swirl chamber-type diesel engine according to the exemplary embodiment of the present invention has the stereoscopic structure in which the height of the bottom surface of the second region, which is distant in the direction of the flow of the combustion gas at the predetermined distance from the first region into which the combustion gas is introduced from the trench part 3c, is greater than the height of the bottom surface of the first region. As a result, a strong swirl of the combustion gas introduced into the clover part 3b may be formed, complicated flows may be activated, and the oxidation capability may be improved, the result of which it is possible to effectively inhibit emission of harmful substances, particularly PM, in exhaust gas.

Furthermore, the bottom surface of the clover part 3b may have the stereoscopic structure in which the height of the bottom surface is gradually increased in the direction of the flow of the combustion gas so that the introduced combustion gas may flow while being gradually raised. In particular, the clover parts 3b have cylindrical structures disposed adjacent to the left and right sides of the trench part 3c, and each of the clover parts 3b has the stereoscopic structure, including a spiral structure in which the height of the bottom surface is gradually increased in the direction of the flow of the combustion gas. As a result, the combustion gas introduced into the clover part 3b flows while being raised along the shape of the bottom surface of the clover part 3b, thereby forming a strong swirl.

In addition, as illustrated in FIG. 12C, the clover part 3b may include a structure in which the height of the bottom surface is gradually increased toward an outer periphery thereof. Further, the bottom surface of the trench part 3c may have a predetermined gradient, such that the combustion gas may be introduced into the clover part 3b while being raised along the gradient of the bottom surface of the trench part 3c.

Figure 13A:
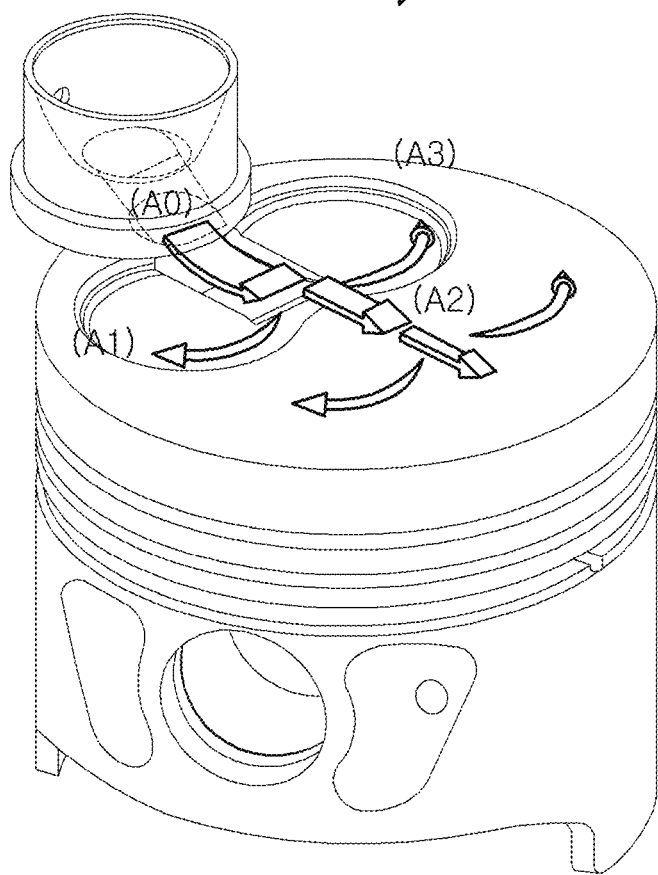
FIGS. 13A and 13B are views for explaining the improvement of a flow of combustion gas in the structure of the primary combustion chamber of the swirl chamber-type diesel engine according to the exemplary embodiment of the present invention.
Figure 13B:
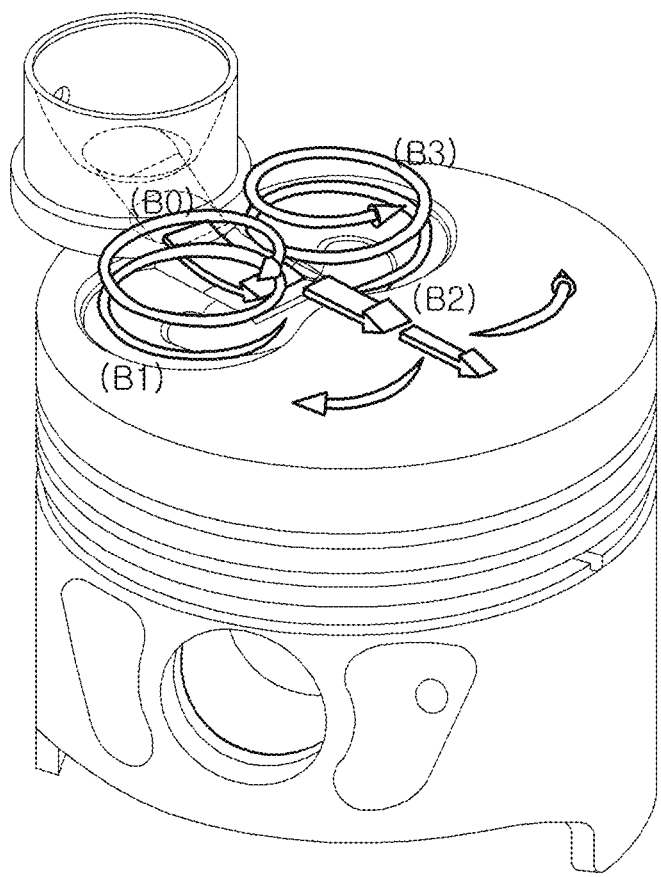

FIGS. 13A and 13B illustrate the improvement of the flow of the combustion gas in accordance with the stereoscopic structure of the bottom surface of the clover part 3b in the swirl chamber-type diesel engine according to the exemplary embodiment of the present invention. First, as illustrated in FIG. 13A, when the combustion gas produced in the secondary combustion chamber 2a is discharged to the primary combustion chamber 3a in the typical swirl chamber-type diesel engine in the related art (A0 in FIG. 13A), a swirl cannot be appropriately formed because the combustion gas introduced into the clover part 3b flows along the flat bottom surface having a constant depth (A1 and A3 in FIG. 13A). As a result, there may occur problems in that complicated flows cannot be activated, the oxidation capability may deteriorate, and emission of harmful substances, particularly PM, in exhaust gas may be increased.

In contrast, as illustrated in FIG. 13B, in the swirl chamber-type diesel engine according to the exemplary embodiment of the present invention, the bottom surface of the clover part 3b of the primary combustion chamber 3a has the stereoscopic structure in which the height of the bottom surface is gradually increased in the direction of the flow of the combustion gas so that the introduced combustion gas may flow while being raised gradually. As a result, the combustion gas introduced into the clover part 3b flows while being raised along the shape of the bottom surface of the clover part 3b, thereby forming a stronger swirl.

More specifically, since the bottom surface of the clover part 3b of the primary combustion chamber 3a has the stereoscopic structure in which the height of the bottom surface is gradually increased in the direction of the flow of the combustion gas, a swirl is strongly formed in the clover part 3b when the combustion gas produced in the secondary combustion chamber 2a is discharged to the primary combustion chamber 3a in the swirl chamber-type diesel engine according to the exemplary embodiment of the present invention (B0 in FIG. 13B). As a result, complicated flows may be activated, the oxidation capability may be improved, and emission of harmful substances, particularly PM, in exhaust gas may be effectively inhibited.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the exemplary embodiments disclosed in the present invention and the accompanying drawings are intended not to limit but to describe the technical spirit of the present invention, and the scope of the technical spirit of the present invention is not limited by the exemplary embodiments and the accompanying drawings. The protective scope of the present invention should be construed based on the following claims, and all the technical spirit in the equivalent scope thereto should be construed as falling within the scope of the present invention.

The invention claimed is:

1. A swirl chamber-type diesel engine comprising:
a secondary combustion chamber assembly coupled to a cylinder head to define a secondary combustion chamber having, on an inner wall surface thereof, a curved swirl induction part, and a connecting passage formed at a lower end of the swirl induction part; and
a piston defining a primary combustion chamber and including a trench part being in communication with the connecting passage, and clover parts formed at both sides of the trench part,
wherein a guide structure is provided in the connecting passage, and the guide structure divides combustion gas, discharged from the secondary combustion chamber to the primary combustion chamber, into three portions and guides the combustion gas,
wherein the guide structure comprises a first guide groove positioned at a center thereof, and a second and a third guide grooves positioned at both sides of the first guide groove,
wherein three curved shapes provided on an upper surface of the connecting passage have a same radius,
wherein the three curved shapes provided on the upper surface of the connecting passage have the same shape throughout the connecting passage,
wherein the first guide groove, the second guide groove, and the third guide groove approximately uniformly divide the combustion gas and guide the combustion gas to be introduced into the trench part in a straight direction or introduced into the clover parts at both sides of the trench part.

2. The swirl chamber-type diesel engine of claim 1, wherein a center of the first guide groove is positioned at a higher position than a straight line that connects a center of the second guide groove and a center of the third guide groove.

3. The swirl chamber-type diesel engine of claim 1, wherein a distance (D) between the second guide groove and the third guide groove is three times a radius (r) of the first guide groove (D=3r).

4. The swirl chamber-type diesel engine of claim 1, wherein a bottom surface of the clover part has a stereoscopic structure in which a height of a bottom surface in a second region, which is distant in a direction of a flow of the combustion gas at a predetermined distance from a first region into which the combustion gas is introduced from the trench part is greater than a height of a bottom surface in the first region.

5. The swirl chamber-type diesel engine of claim 4, wherein the bottom surface of the clover part has a stereoscopic structure in which the height of the bottom surface is gradually increased in the direction of the flow of the combustion gas so that the introduced combustion gas flows while being gradually raised.

6. The swirl chamber-type diesel engine of claim 4, wherein the clover parts have cylindrical structures disposed adjacent to both sides of the trench part, and each comprise a spiral structure in which the height of the bottom surface is gradually increased in the direction of the flow of the combustion gas.

7. The swirl chamber-type diesel engine of claim 4, wherein the clover part has a structure in which the height of the bottom surface is gradually increased toward an outer periphery thereof.

8. The swirl chamber-type diesel engine of claim 4, wherein the bottom surface of the trench part has a predetermined gradient so that the combustion gas to be introduced into the clover part is introduced while being raised.

* * * * *